US011519710B2

(12) United States Patent
Tixier et al.

(10) Patent No.: US 11,519,710 B2
(45) Date of Patent: Dec. 6, 2022

(54) HIGH ACCURACY AND HIGH STABILITY MAGNETIC DISPLACEMENT SENSOR IN THE PRESENCE OF ELECTROMAGNETIC INTERFERENCES

(71) Applicant: Honeywell Limited, Mississauga (CA)

(72) Inventors: Sebastien Tixier, North Vancouver (CA); Michael Hughes, North Vancouver (CA)

(73) Assignee: Honeywell Limited, Mississauga (CA)

( * ) Notice: Subject to any disclaimer, the term of this patent is extended or adjusted under 35 U.S.C. 154(b) by 252 days.

(21) Appl. No.: 16/801,821

(22) Filed: Feb. 26, 2020

(65) Prior Publication Data

US 2021/0262776 A1    Aug. 26, 2021

(51) Int. Cl.
*G01B 7/06*    (2006.01)
*G01D 5/20*    (2006.01)

(52) U.S. Cl.
CPC ........... *G01B 7/107* (2013.01); *G01D 5/2033* (2013.01)

(58) Field of Classification Search
CPC .. G02B 7/107; G01D 5/2033; G01B 2210/44; G01B 11/06; G01B 21/08; G01B 21/8901; G01B 2210/46; G01B 7/02; G01B 7/023; G01B 7/06; G01B 7/10; G01B 7/102; G01B 7/107; G01N 33/346
See application file for complete search history.

(56) References Cited

U.S. PATENT DOCUMENTS 4,678,915 A * 7/1987 Dahlquist .............. G01N 21/86
73/159
5,099,125 A * 3/1992 Hellstrom ............ G01N 33/346
250/359.1
(Continued)

FOREIGN PATENT DOCUMENTS

JP    2002533661 A    10/2002
JP    2010038597 A    2/2010
WO    2020068711 A1    4/2020

OTHER PUBLICATIONS

Office Action for corresponding JP Application No. 2021-012240, dated Jan. 14, 2022.
(Continued)

*Primary Examiner* — Steven L Yeninas
(74) *Attorney, Agent, or Firm* — Charles H. Jew

(57) ABSTRACT

An accurate and stable displacement sensor that reads through coated metal substrates achieves better than one micron accuracy includes: an electromagnetic coil positioned in a first enclosure; (ii) means for generating a magnetic field from the electromagnetic coil; (iii) a second enclosure which is spaced apart from the first enclosure, wherein the second enclosure includes dual magnetic sensors, such as fluxgate sensors, that are configured to measure the magnetic field; and (iv) means for calculating the separation between the operative surfaces of the enclosures from magnetic field measurements. A permanent magnet can be used instead of the electromagnetic coil and associated driving energy source. A precise displacement measurement
(Continued)

is given by a mathematical function (such as the ratio or difference) of the two magnetic sensors demodulated signals. The displacement sensor can be mounted on a maneuverable C-frame to monitor the caliper of anodes and cathodes produced for lithium ion batteries.

20 Claims, 3 Drawing Sheets

(56) References Cited

U.S. PATENT DOCUMENTS

| | | | | |
|---|---|---|---|---|
| 5,539,675 | A * | 7/1996 | Carroll, Sr. | G01B 7/10 |
| | | | | 702/170 |
| 5,714,763 | A | 2/1998 | Chase | |
| 5,754,294 | A | 5/1998 | Jones | |
| 5,770,949 | A * | 6/1998 | Sgro | G01B 7/107 |
| | | | | 162/263 |
| 6,265,867 | B1 | 7/2001 | Fowler | |
| 6,281,679 | B1 | 8/2001 | King | |
| 6,586,930 | B1 * | 7/2003 | Kumar | G01B 7/10 |
| | | | | 324/225 |
| 6,967,726 | B2 | 11/2005 | King | |
| 7,298,492 | B2 | 11/2007 | Tixier | |
| 8,527,212 | B2 | 9/2013 | Hughes | |
| 8,564,851 | B2 | 10/2013 | Beselt | |
| 8,760,669 | B2 | 6/2014 | Heath | |
| 9,063,190 | B2 * | 6/2015 | Garshelis | G01R 33/123 |
| 9,182,360 | B2 | 11/2015 | Tixier | |
| 9,612,213 | B2 | 4/2017 | Meijer Drees | |
| 9,891,164 | B2 | 2/2018 | Tixier | |
| 10,234,274 | B2 | 3/2019 | Fuellmeier | |
| 10,281,318 | B1 | 5/2019 | Lawrence | |
| 10,578,419 | B2 * | 3/2020 | Ausserlechner | G01D 5/165 |
| 2005/0157314 | A1 * | 7/2005 | Typpoe | G01B 11/0691 |
| | | | | 356/630 |
| 2016/0123773 | A1 * | 5/2016 | Beselt | G01D 5/147 |
| | | | | 324/202 |
| 2019/0285527 | A1 | 9/2019 | Tixier et al. | |
| 2020/0096308 | A1 | 3/2020 | Hughes et al. | |

OTHER PUBLICATIONS

English Translation of Office Action for corresponding JP Application No. 2021-012240, dated Jan. 14, 2022.
Extended European search report for corresponding EP Application No. 21156408.3 dated Jul. 16, 2021.

* cited by examiner

… (1)

HIGH ACCURACY AND HIGH STABILITY MAGNETIC DISPLACEMENT SENSOR IN THE PRESENCE OF ELECTROMAGNETIC INTERFERENCES

FIELD OF THE INVENTION

The present invention generally relates to scanner measurement systems for determining parameters of continuous sheet materials and, more particularly, to non-contacting thickness or caliper measurement techniques of sheet materials containing metal such as coated metal foils and substrates used to manufacture anodes and cathodes for electrochemical cells and batteries.

BACKGROUND OF THE INVENTION

Numerous methods exist for measuring the thickness of a moving web or sheet. For instance, a non-contact laser caliper apparatus comprises a laser source on either side of the web, whose light is directed onto the web surface and subsequently reflected to a receiver. The characteristics of the received laser signal are thereafter used to determine the distance from each receiver to the web surface. These distances are added together, and the result is subtracted from a known value for the distance between the two laser receivers. The result represents the web's thickness.

To compensate for the possibility of changes in the distance between the two laser sensors, prior art systems incorporate an eddy current sensor to detect the distance between the two laser sensors. Typically, the eddy current sensor comprises of an RF coil at an upper sensor enclosure that is fixed with respect with a top sensor and metal target at the lower sensor closure that is fixed with respect to the lower laser sensor. These non-contact devices are suitable for measuring paper and plastic but not for measuring conductive materials such as coated substrates used in fabricating anodes and cathodes for lithium ion batteries.

The art is in need of an accurate and repeatable technique for measuring the thickness and related properties of coatings and films that are formed on continuous, traveling non-uniform webs made of metal containing materials.

SUMMARY OF THE INVENTION

The present invention is based in pan on the development of a high accuracy and high stability displacement sensor that measures the distance between the top and bottom scanning head. The displacement sensor reads through metal materials such as coated metal substrates used in fabricating conductive anodes and cathodes suitable for lithium ion electrochemical cells and batteries. The displacement sensor exhibits better than 1 micron accuracy.

In one aspect, the invention is directed to a magnetic absolute displacement sensor that includes:

a source of a magnetic field that is positioned in a first enclosure that defines a first operative surface;

a second enclosure that defines a second operative surface which is spaced apart from the first operative surface, wherein the second enclosure includes a first magnetic sensor that is configured to measure the magnetic field and a second magnetic sensor that is configured to measure the magnetic field; and means for calculating the separation between the first and second operative surfaces from magnetic field measurements from the first and second magnetic sensors.

A permanent magnet can be used to generate the magnetic field. Alternatively, an electromagnetic coil that is driven by direct or alternating current can be used to generate the magnetic field in the first enclosure.

In another aspect, the invention is directed to a system for monitoring a property of a sheet of material that can contain metal wherein the sheet has a first side and a second side which includes:

a first member disposed adjacent to the first side of the sheet of material, the first member having means for producing a magnetic field;

a second member disposed adjacent to the second side of the sheet of material, the second member having a first magnetic sensor that detects the magnetic field and generates a first electrical signal and a second magnetic sensor that detects the magnetic field and generates a second electrical signal; and means for analyzing the first electrical signal and second electrical signal to determine changes in a distance between the first and second members.

In yet another aspect, the invention is directed to a method of measuring the thickness of a web having a first side and a second side that includes:

providing a first distance sensor on the first side of the web;

determining the position of the first distance sensor relative to the first side of the web with the first distance sensor;

providing a second distance sensor on the second side of the web;

determining the position of the second distance sensor relative to the second side of the web with the second distance sensor;

generating a magnetic field at a fixed location relative to the first distance sensor on the first side of the web;

positioning first and second magnetic sensors at respective fixed first and second locations to the second distance sensor on the second side of the web;

measuring the magnetic field with the first and second magnetic sensors; and determining the thickness of the web from measurements of the magnetic field by the first and second magnetic sensors.

The magnetic displacement sensor is preferably incorporated into an online scanning system wherein the sheet being monitored travels between the dual scanner heads enclosing the electromagnetic coil and magnetic sensors. The dual scanner heads traverse back and forth along the cross direction relative to the sheet, which typically has a thickness of 0.005 to 5 mm. One embodiment of the scanning system employs a slidably moveable C-frame structure with dual arms or members to which the two scanner heads are attached. With the C-frame, the magnetic sensors and other sensors can be mounted directly onto the elongated members so that scanner heads are not needed. In this configuration, a permanent magnet can be integrated into or attached to one of the elongated members that is opposite the other member with the dual magnetic field sensors. The magnetic sensors can be calibrated by positioning a target sample of known thickness in the measurement gap or channel between the upper and lower scanner heads. The target sample can be a foil or standardization tile. A target sample is measured by the optical displacement sensors. The gap is OD1+OD2+t, where ODx are the optical displacement readings and t is the thickness. This can be compared to the reading from the magnetic sensors.

The gap size is then adjusted by placing a series of weights on the upper arm of the C-frame structure. The gap size adjustments are detected by the optical displacement sensors. A curve or mathematical function is constructed from the data using curve-fitting techniques. The curve or parametric equation is the calibration that correlates a mathematical operation of the readings from the two magnetic sensors to the size or distance of the gap.

The present invention is particularly suited for quality control in the production of anodes and cathodes for lithium ion cells and batteries. In making these electrodes, a metal substrate or foil is coated with an anode or cathode composition and the coated foil is then processed in a press section of an assembly process which controls the final caliper of the electrode Caliper or thickness is a critical electrode specification.

The inventive displacement sensor reads through the electrodes which typically consist of copper or aluminum substrates. To meet lithium ion battery specifications, an accuracy of better than 1 micron is required. Conventional eddy current sensors cannot be used because of the conductive electrodes. In addition, displacement sensor, which employs two independent magnetic sensors that measure a magnetic field, exhibits the accuracy and repeatability required. Furthermore, it is not highly sensitive to interfering magnetic fields produced by power lines, motors and steel rolls.

It has been demonstrated that a 1 KHz sinusoidal magnetic field of a few tens of mTesla can be produced by an electromagnetic coil positioned in an upper scanner head. The time varying magnetic field can be sensed by two magnetic sensors, typically two fluxgate sensors, that are positioned a few centimeters apart in the lower scanner head. The signal from the magnetic sensors is demodulated using the 1 KHz coil signal as a sync signal. A precise displacement measurement is given by a mathematical function (such as the ratio or difference) of the two magnetic sensors demodulated signals.

The 1 KHz modulation/demodulation scheme produces a signal with high signal to noise while filtering the effect of interfering magnetic fields either static or time varying. The ratio (or difference) of the two magnetic sensor outputs cancels the effect of variation in current flowing through the coil and provides a highly stable and reliable measurement.

DETAILED DESCRIPTION OF THE PREFERRED EMBODIMENTS

Figure 1:
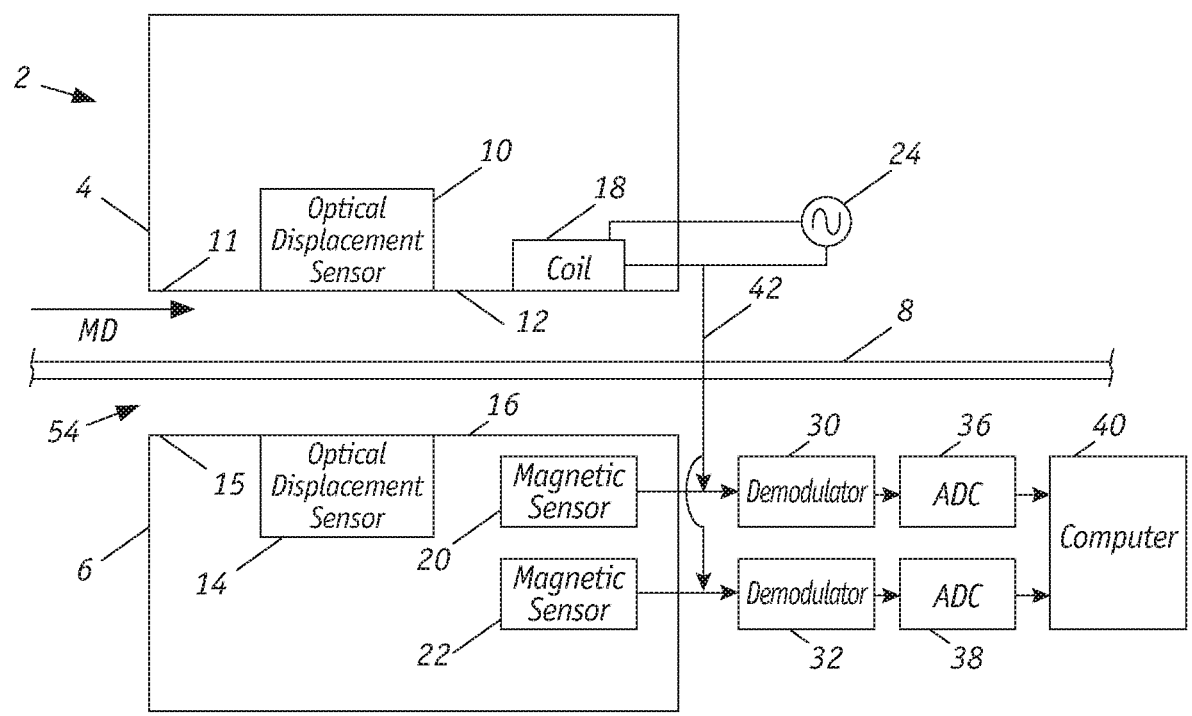
FIG. 1 is a schematic of scanner heads of a thickness measurement apparatus.

FIG. 1 illustrates an embodiment of a non-contacting caliper sensor system 2 that includes upper and lower sensing scanner enclosures or heads 4 and 6, which are positioned on opposite sides of web or sheet 8 that is traveling in the machine direction (MD). The lower surface 11 of upper enclosure 4 and the upper surface 15 of lower enclosure 6 define a measurement gap or channel 54 through which web 8 travels. If the caliper measurement is to be performed in a scanning manner across the web 8 in the cross direction, the heads are aligned to travel directly across from each other as they traverse the moving web. In a preferred embodiment, upper head 4 includes a first optical displacement sensor 10 that gauges the perpendicular distance between lower surface 11 to the top surface of moving web 8. Similarly, the lower head 6 includes a second optical displacement sensor 14 that gauges the perpendicular distance between the upper surface 15 to the bottom surface of moving web 8. The enclosure surfaces 11 and 15 that are adjacent to the first and second optical displacement sensors 10 and 14, respectively, define apertures 11 and 12. Purge air is used to prevent dust from entering the scanner heads through these apertures. A suitable optical displacement sensor is the confocal imaging displacement sensor, model CL-3000 from Keyence Corporation.

In addition to optical displacement sensors, laser-based triangulation devices, nuclear, IR, RF, radar or microwave radiation-based device, acoustic-based systems, pneumatic-based devices, can be employed.

Caliper sensor system 2 also incorporates a magnetic displacement or distance measurement mechanism for determining the distance between the upper and lower heads. The mechanism includes an electromagnetic coil 18 that is positioned in upper head 4 and first and second magnetic sensors 20, 22 that, are positioned in lower head 6. The two magnetic sensors are preferably positioned in tandem and aligned with the coil along an axis. The electromagnetic coil is connected to a source of direct or alternating current to generate a magnetic field that is measured by the pair of magnetic sensors. Instead of using an electromagnetic coil and associated driving current source, a permanent magnet can be used as the source of magnetic field in upper enclosure 4.

In the configuration shown in FIG. 1, coil 18 is driven by an alternating current source 24 which also generates a reference signal 42 to demodulation circuits 30 and 32. When the magnetic field is generated by coil 18, fluxgate magnetic sensors 20 and 22 generates signals that are sent to demodulation circuits 30 and 32, respectively. A suitable fluxgate magnetic sensor is model DRV425 from Texas Instruments. Typically, fluxgate sensors will only measure magnetic fields of up to 2 mT; it is preferable to maximize the magnetic field at the first fluxgate 20 so that it is close to this limit in order to reduce the possibility of an external field interfering with the desired signal. The demodulated outputs are digitized in analog-to-digital converters (ADCs) 36 and 38 and sent to computer 40. Alternatively, the signals from the magnetic sensors can undergo self-demodulation, without relying on the sync signal 42, to yield the demodulated outputs. The two measured voltages from the magnetic sensors 20 and 22 are proportional to the magnetic fields. The computer, which includes a microprocessor and memory that contains a lookup tables and/or parametric equations, analyzes that two measured voltages and applies the two optical displacement values to calculate the caliper of web 8.

One method of analyzing the data and obtaining displacements is to utilize ratios or differences in the two voltages. Magnetic flux density at a point along the axis of the coil can be calculated with the Biot-Savant relationship and is proportional to the inverse cube of the distance from the coil along the coil axis. Therefore, the ratio of the magnetic flux density at the positions of the two sensors is related to the cube of the ratio of the distances of the sensors from the coil. $B=\mu_o NIAR^2/(2(R^2+Z^2)^{3/2})$, where $\mu_o$=vacuum permeability, N=number of windings of the coil, I=electric current through the coil, A=area enclosed by the coil, Z=distance from the coil to the sensor, R=radius of coil loops. Thus $B_1/B_2=\{(R^2+Z_2^2)/(R^2+Z_1^2)\}^{3/2}$. The subscripts 1 and 2 refers to the measured magnetic flux density and coil-sensor distance for sensors 20 and 22. Since the distance between the sensors is fixed, where $Z_2$ is related to $Z_1$ by the sensor separation distance, the coil-sensor distance can be calculated through the above relationship and changes in the coil-sensor distance obtained from changes in the magnetic flux density ratio. Changes in the coil-sensor distance can then be used to correct for the changes in the separation distance of the upper and lower heads of the optical displacement devices of the non-contacting caliper sensor. Similarly, a relationship utilizing the difference between the magnetic flux densities at the two sensor locations can be used to calculate the coil-sensor distance and changes in the coil-sensor distance.

Figure 2:
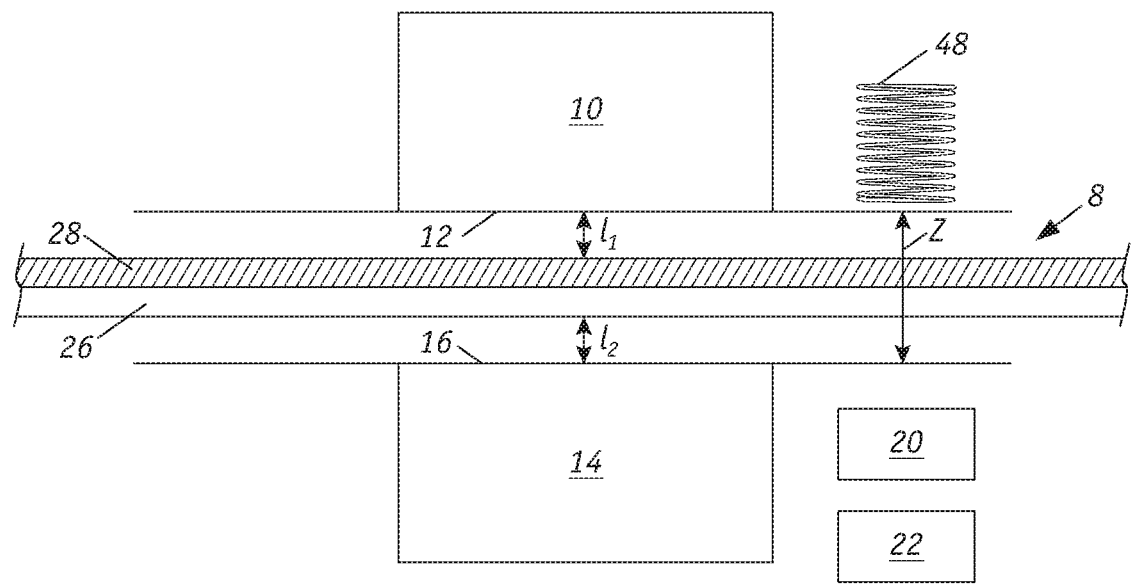
FIG. 2 shows the operation of the thickness measurement apparatus.

FIG. 2 illustrates the operation of caliper sensor system 2 in measuring the thickness of a web 8 that consists of a metal substrate 26 which is coated with an anode or cathode layer 28. Optical displacement sensor 10 measures the distance $l_1$ from aperture 12 to the surface of coating 28 and optical displacement sensor 14 measures the distance $l_2$ from aperture 16 to metal substrate 26. For illustrative purposes, the lower surface of sensor 10 is positioned at aperture 12 and therefore is co-planar with lower surface 11 of the top enclosure 4 and similarly the upper surface of sensor 14 is positioned at aperture 16 and therefore is co-planar with upper surface 15 of the lower enclosure 6.

In this configuration, the electromagnetic coil 48 has a helical structure and the two magnetic sensors 20, 22 are positional coaxially with the coil. It should be noted that in the case of a fluxgate magnetic sensor, the coil therein is very small relative to the electromagnetic coil 48. In designing the electromagnetic coil or permanent magnet, it is often preferred to choose a small one such that the field decays rapidly with distance in order to obtain the highest sensitivity to gap changes. The schematic depictions of magnetic sensors 20 and 22 are enlarged. The coil 48 is typically separated from magnetic sensor 20 by 5 to 25 mm and from the magnetic sensor 22 by 10 to 25 mm. Suitable coils are made of thin copper wire of approximately AWG 30 which is wound in a plastic bobbin and inserted into ferrite such that the back of the coil has ferrite and the front has no ferrite. The thickness of web 8 is equal to Z minus $l_1$ and $l_2$.

The magnetic sensors 20, 22 are concentric with electromagnetic coil 48 so that the measurement axis of the dual magnetic sensors is collinear with the axis of symmetry of the coil. The coil can be circular in shape; it has been demonstrated that oval shaped coils may result in magnetic measurements with improved spatial resolution in one dimension.

The web 8 consists of a coated metal substrate such as electrode-coated metal foils used in the fabrication of anodes and cathodes for lithium ion electrochemical cells and batteries. The web 8 includes an aluminum or copper foil 26 that is coated with an electrode coating 28. The foil is typically 9 to 50 μm thick and the electrode coating ranges from 75 to 400 μm in thickness on one or both sides of the foil so that a double-side coated electrode can have a caliper of up to 850 μm with most being typically about 250 microns in thickness. For anodes the electrode coating includes graphite and for cathodes the electrode coating includes a lithium metal oxide such as $LiCoO_2$. Electrodes are typically coated on both sides of a foil and the electrode coatings also include binders and conductivity enhancers.

The 1 KHz modulation/demodulation scheme produces a signal with high signal to noise while filtering the effect of interfering magnetic fields either static or time varying. The ratio (or difference) of the two magnetic sensor outputs cancels the effect of variation in current flowing through the coil and provides a highly stable and reliable measurement. It should be noted that higher frequencies will cause the effects associated with the conductive sheet to be more pronounced and noticeable. In contrast, lower frequencies produce less interference but will result in slower responses from the demodulation circuit. In the case of a DC field, one fluxgate sensor is typically used to measure any interfering magnetic field and can be used to cancel the effect. DC fields are more susceptible to interference from surrounding machinery.

The caliper of a moving sheet 22 that travels between two heads 62, 64 is determined by making the optical displacement measurement, d (optical), and inductive measurement, d (inductive). Thereafter, the thickness (t) of sheet 22 is calculated as being the difference between the two measurements with a constant offset, that is: t=d (inductive)-d (optical)-C. The offset constant is determined by calibration that is preferably conducted by taking a zero measurement when the sensor is offsheet, that is, when there is no sheet between the heads. The constant is determined by measuring something of known thickness as previously described. If the head separation varies slowly due to mechanical forces or thermal changes, an operator can periodically calculate the offset by scanning over a tile of known thickness during a standardization process. In addition, the standardization procedure can be used to detect abnormal conditions, such as if the optical sensors get dirty.

Instead of or in addition to employing optical displacement sensors 10, 14 to measure caliper, the scanner heads can serve as platforms for carrying sensors to detect sheet properties such as moisture and basis weight in the case of paper or characteristics of plastics. These devices typically use infrared, near-infrared and microwave radiation. Suitable sensors are described in U.S. Pat. No. 9,182,360 to Tixier and Hughes, U.S. Pat. No. 8,527,212 to Hughes and Tixier and U.S. Pat. No. 7,298,492 to Tixier, which are incorporated herein by reference.

Figure 3:
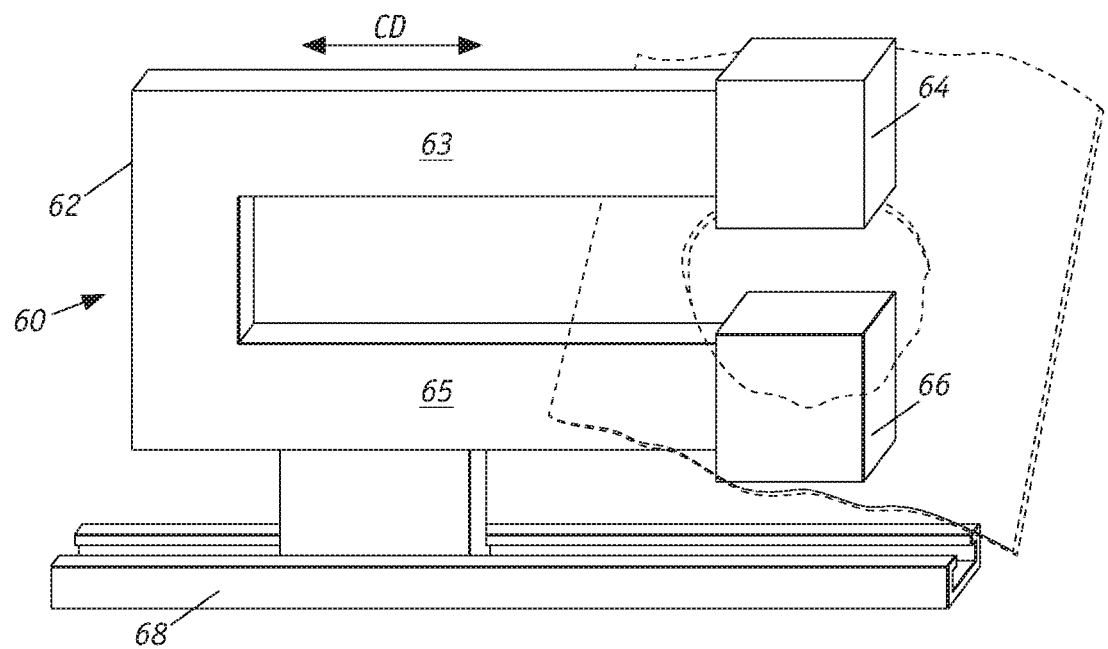
FIG. 3 depicts an online scanning system with scanner heads secured to C-frame structure that is mounted on the translation mechanism.

FIG. 3 illustrates a scanning sensor system 60 wherein upper and lower scanner heads 64 and 66 are mounted on the elongated upper 63 and lower 65 arms or members, respectively, of a C-frame 62. The rigid members are parallel to each other. The frame 62 is equipped with a translation mechanism 69 which is configured as a linear slide to which the C-frame is movably secured. The upper head 64 incorporates the first optical displacement sensor 10 and coil 18 and lower head 66 incorporates the second optical displacement sensor 14 and dual magnetic sensors 20, 22 as shown in FIG. 1. The measurement channel between the heads accommodates the sheet of material being. The heads move back and forth along the cross direction (C) as the sheet is monitored.

Instead of employing upper and lower heads that are secured to the distal ends of the elongated members 63 and 65, the sensor components can be integrated into or attached directly to the members of the C-frame. For instance, a permanent magnet can be secured to upper member 63 and corresponding fluxgate sensors mounted to the lower member 65. Similarly, confocal displacement sensors can be mounted directly to the members.

A feature of affixing the heads on the arms of the C-frame structure is that the dual magnetic sensors can be calibrated without removing them from the lower head. By applying different levels of force on the upper head 64, the distance between the two heads will vary. In particular, weights are placed on the upper head 64 incrementally to cause the distance between the head to decrease. A target sample of known thickness is positioned between the heads and the optical displacement sensor devices on the heads can be utilized to measure the distance between the heads simultaneously with the coil-sensor measurements to calibrate the coil-sensor distance changes.

Figure 4:
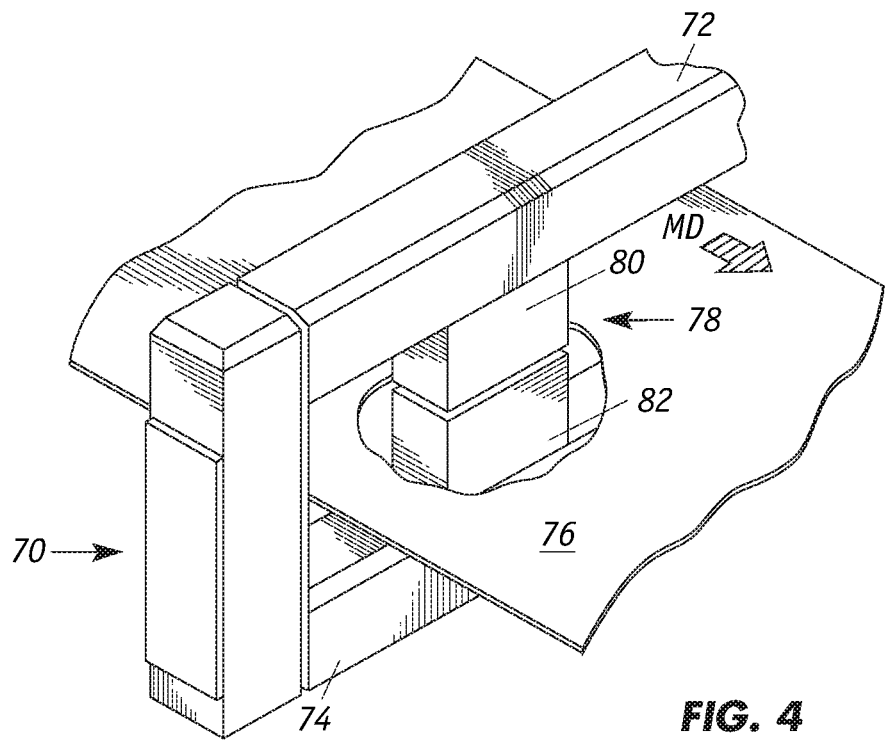
FIG. 4 depicts another online scanning system.

FIG. 4 illustrates a scanning sensor system 70 that includes dual head scanner heads 80, 82 measures the thickness or other properties during continuous web production. This scanning system is particularly suited for monitoring of wide webs or sheets such as during paper production where the paper can be more than ten meters wide. The upper head 80 and lower head 82 are supported by two transverse beams 72 and 74, respectively. The operative faces of the heads define a measurement gap 78 that accommodates sheet 76 which moves in the MD. Upper head 80 incorporates the first optical displacement sensor 10 and coil 18 and lower head 82 incorporates the second optical displacement sensor 14 and dual magnetic sensors 20, 22 as shown in FIG. 1. The cross directional movement of the dual scanner heads is synchronized with respect to speed and direction so that they are aligned with each other.

For the scanner sensor system 70, the magnetic displacement sensor is calibrated off-line before the components are incorporated into the upper and lower heads. For example, the dual fluxgate magnetic sensors can be secured to a stationary platform while the electromagnetic coil is mounted on a translation stage. The magnetic sensors and coil remain aligned as the translation stage is moved. An optical encoder or an interferometer measure the distance between the coil and the stationary platform.

Figure 5:
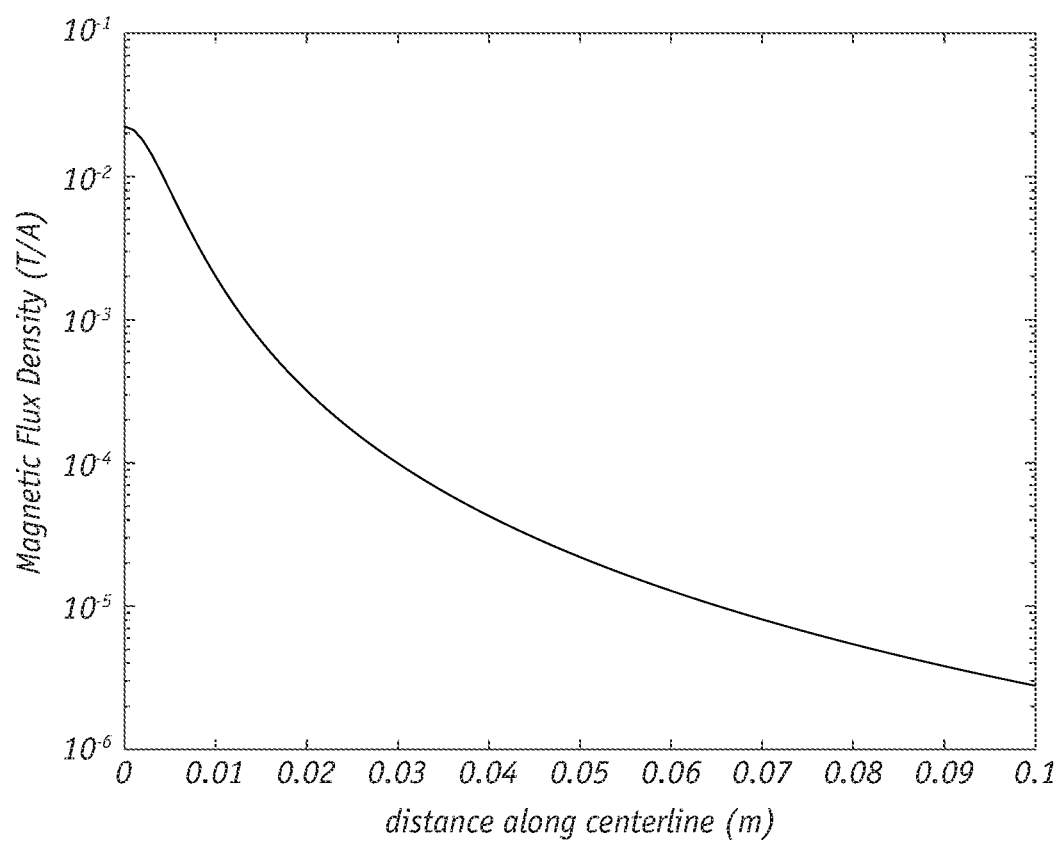
FIG. 5 is a graph of magnetic flux density vs distance along a centerline as calculated from the Biot-Savart law.

FIG. 5 is a graph of magnetic flux density vs. distance along the centerline calculated from the Biot-Savart law for a coil with 178 turns and having a diameter of 1 cm. This data, along with the saturation level of the chosen magnetic detector, defines the required design parameters for the coil and coil-sensor distance.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A system for monitoring a property of a sheet of material that comprises a metal layer and wherein the sheet has a first side and a second side which comprises:
    a first member disposed adjacent to the first side of the sheet of material, the first member having means for producing a magnetic field that comprises an electromagnetic coil;
    a second member disposed adjacent to the second side of the sheet of material, the second member having a first magnetic sensor that detects the magnetic field density and generates a first electrical signal and a second magnetic sensor that detects the magnetic field density and generates a second electrical signal wherein the first magnetic sensor and the second magnetic sensor are aligned coaxially with the electromagnetic coil; and
    means for analyzing the first electrical signal and second electrical signal to determine changes in a distance between the first and second members.

2. The system of claim 1 further comprising a third sensor that measures a property or characteristic of the sheet of material.

3. The system of claim 1 wherein the first member has a first mounting head and the second member has a second mounting head and the two mounting heads define a gap in which the sheet of material is positioned and the means for analyzing the first electrical signal and the second electrical signal determines the distance of the gap.

4. The system of claim 3 further comprising a first distance sensor in the first mounting head operative to determine a first distance between the first distance sensor and the first side of the sheet of material and a second distance sensor in the second mounting head operative to determine a second distance between the second distance sensor and the second side of the sheet of material.

5. The system of claim 1 wherein the first magnetic sensor comprises a first fluxgate sensor and the second magnetic sensor comprises a second fluxgate sensor.

6. The system of claim 1 wherein the means for producing a magnetic field is configured to produce a time varying magnetic field.

7. The system of claim 1 wherein the means for producing a magnetic field is a permanent magnet.

8. The system of claim 1 wherein the sheet of material has a thickness that ranges from 0.005 to 5 mm.

9. The system of claim 1 wherein the sheet of material comprises a metal substrate that is coated with an anode or cathode material.

10. The system of claim 1 wherein the means for analyzing the first electrical signal and second electrical signal analyzes the ratio of or the difference between the first and second electrical to derive the distance between the first and second members.

11. The system of claim 1 having a slidably movable frame having (i) an upper elongated rigid member and (ii) a lower rigid elongated member that is parallel to the upper elongated rigid member.

12. A magnetic displacement sensor that comprises:
    a source of a magnetic field that is positioned in a first enclosure that defines a first operative surface;
    a second enclosure that defines a second operative surface which is spaced apart from the first operative surface, wherein the second enclosure includes a first magnetic sensor that is configured to measure the magnetic field density and a second magnetic sensor that is configured to measure the magnetic field density and wherein the first and second magnetic sensors comprise first and second fluxgate sensors that are positioned in tandem and wherein the first and second fluxgate sensors and the source of magnetic field are oriented along an axis; and
    means for calculating the separation between the first and second operative surfaces from magnetic field measurements from the first and second magnetic sensors and wherein the first operative surface and the second operative surface define a measurement gap in which a metal containing substrate, which has a first and second side, travels and wherein the first enclosure includes a first distance sensor that determines a first distance from the first operative surface to the first side of the substrate and the second enclosure includes a second distance sensor that determines a second distance from the second operative surface to the second side of the substrate.

13. The device of claim 12 wherein the source of magnetic field comprises a permanent magnet.

14. The device of claim 12 wherein the source of magnetic field comprises an electromagnetic coil and the device further comprises a direct or alternating current source that drives the electromagnetic coil.

15. The device of claim 12 comprising means for calculating the thickness of the substrate.

16. A method of measuring the thickness of a web that comprises a metal layer and having a first side and a second side that comprises:
  providing a first distance sensor on the first side of the web;
  determining the position of the first distance sensor relative to the first side of the web with the first distance sensor;
  providing a second distance sensor on the second side of the web;
  determining the position of the second distance sensor relative to the second side of the web with the second distance sensor;
  generating a magnetic field at a fixed location relative to the first distance sensor on the first side of the web;
  positioning first and second magnetic sensors at respective fixed first and second locations to the second distance sensor on the second side of the web wherein the first and second magnetic sensors are aligned coaxially with the magnetic field that is generated;
  measuring the magnetic field density with the first and second magnetic sensors; and
  determining the thickness of the web from measurements of the magnetic field density by the first and second magnetic sensors.

17. The method of claim 16 wherein an electromagnetic coil is used to generate a time varying magnetic field and wherein the first magnetic sensor, second magnetic sensor and the electromagnetic coil are coaxially aligned.

18. The method of claim 16 wherein a permanent magnet is used to generate the magnetic field.

19. The method of claim 16 wherein the web comprises a metal substrate that is coated with an anode or cathode material.

20. The method of claim 19 wherein the metal substrate is 9 to 50 µm thick.

\* \* \* \* \*